(12) United States Patent
Gallestey Alvarez et al.

(10) Patent No.: US 9,539,582 B2
(45) Date of Patent: Jan. 10, 2017

(54) METHOD OF OBSERVING A CHANGE OF MASS INSIDE A GRINDING UNIT

(71) Applicant: ABB RESEARCH LTD, Zurich (CH)

(72) Inventors: Eduardo Gallestey Alvarez, Mellingen (CH); Konrad Stadler, Niederweningen (CH)

(73) Assignee: ABB Research LTD (CH)

( * ) Notice: Subject to any disclaimer, the term of this patent is extended or adjusted under 35 U.S.C. 154(b) by 411 days.

(21) Appl. No.: 14/079,225

(22) Filed: Nov. 13, 2013

(65) Prior Publication Data

US 2014/0070034 A1      Mar. 13, 2014

Related U.S. Application Data

(63) Continuation of application No. PCT/EP2012/058708, filed on May 11, 2012.

(30) Foreign Application Priority Data

May 13, 2011   (EP) .................................. 11166126

(51) Int. Cl.
| | |
|---|---|
| *B02C 25/00* | (2006.01) |
| *G05B 13/04* | (2006.01) |
| *B02C 17/18* | (2006.01) |
| *B02C 23/12* | (2006.01) |

(52) U.S. Cl.
CPC .............. *B02C 25/00* (2013.01); *B02C 17/183* (2013.01); *B02C 17/1805* (2013.01); *B02C 23/12* (2013.01); *G05B 13/04* (2013.01)

(58) Field of Classification Search
CPC ........... B02C 25/00; B02C 23/00; B02C 23/12
USPC ....................................................... 241/33–37
See application file for complete search history.

(56) References Cited

U.S. PATENT DOCUMENTS

| | | | | |
|---|---|---|---|---|
| 4,611,763 A | * | 9/1986 | Tomiyasu | ............... B02C 25/00 241/30 |
| 7,850,104 B2 | * | 12/2010 | Havlena | ................ B02C 15/007 241/119 |
| 2011/0208341 A1 | | 8/2011 | Stadler et al. | |
| 2013/0248626 A1 | * | 9/2013 | Held | .................... G05B 13/041 241/30 |

FOREIGN PATENT DOCUMENTS

| | | |
|---|---|---|
| DE | 27 41 510 C2 | 3/1979 |
| DE | 199 33 995 A1 | 3/2001 |
| DE | 299 23 959 U1 | 1/2002 |
| EP | 2 169 483 A1 | 3/2010 |

(Continued)

OTHER PUBLICATIONS

International Search Report (PCT/ISA/210) mailed on Nov. 22, 2012, by the European Patent Office as the International Searching Authority for International Application No. PCT/EP2012/058708.

(Continued)

*Primary Examiner* — Faye Francis
(74) *Attorney, Agent, or Firm* — Taft Stettinius & Hollister LLP

(57) ABSTRACT

A system and method are disclosed for observing a change of mass inside a grinding unit as a part of a grinding process with a storing unit. The change of mass is derived from a mass balance for the grinding unit and a mass balance for the storing unit.

10 Claims, 2 Drawing Sheets

(56) References Cited

FOREIGN PATENT DOCUMENTS

EP           2169483  A1    3/2010
WO    WO 2007/110466 A1    10/2007

OTHER PUBLICATIONS

Written Opinion (PCT/ISA/237) mailed on Nov. 22, 2012, by the European Patent Office as the International Searching Authority for International Application No. PCT/EP2012/058708.
International Preliminary Report on Patentability (PCT/IPEA/409 issued on Apr. 11, 2013 by the European Patent Office as the International Searching Authority for International Application No. PCT/EP2012/058708.
European Search Report issued on Feb. 1, 2012.

\* cited by examiner

METHOD OF OBSERVING A CHANGE OF MASS INSIDE A GRINDING UNIT

RELATED APPLICATIONS

This application claims priority as a continuation application under 35 U.S.C. §120 to PCT/EP2012/058708, which was filed as an International Application on May 11, 2012 designating the U.S., and which claims priority to European Application 11166126.0 filed in Europe on May 13, 2011. The entire contents of these applications are hereby incorporated by reference in their entireties.

FIELD

The present disclosure relates to the field of grinding processes, and for example, to a method of observing a change of mass inside a grinding unit such as a ball mill or semi-autogenous grinding (SAG) mill.

BACKGROUND INFORMATION

Grinding processes have been used in industrial processes, such as for cement and minerals production and for food processing. The purpose is to grind raw material to an adequate grain size. Thus, the surface is increased so that subsequent chemical reactions or mechanical separation processes can take place more efficiently.

A large amount of electrical energy is consumed in the grinding processes. For example electrical energy cost is the second largest cost position in the cement production process. For that reason grinding optimization systems are widely used in industry.

These optimization systems rely on the amount of mass inside the grinding unit which is related to a filling level or filling degree. This quantity changes continuously for instance due to the variable hardness of the material to be ground. Measuring inside a grinding unit is not possible during operation because of the grinding work and resulting dust. An additional issue is that an output from the grinding unit can not be measured directly because the mass transport is done by convection either with water or with air.

A measurement principle outside of the grinding unit, which is also known as an "electric ear" and which is widely used such as for ball mills, detects noise or vibration of a mill shell with a microphone. The idea is that when the mill is becoming empty, the noise or the vibration level is higher than when the mill is filling up. The results however can be unreliable and often useless when there is a poor accuracy of the measurements. Performing a spectral analysis of the noise and identifying a relative share of selected frequencies can slightly improve the accuracy. But an air gap between the mill shell and the microphone which can make the method very prone to interferences from neighboring sources of noise, and the thick walls of the shell which unpredictably influence different frequencies, can still lead to an insufficient accuracy.

DE 19933995 discloses a measurement system for observing a mass inside a ball mill using microphones directly attached to the wall of the mill shell. The system analyzes an intensity and spectra of the noise, and combines them with measurements of the phase angle of the mill to gain additional information about the movement of balls inside the mill. But the proposed solution can suffer from an unpredictable influence and an insufficient accuracy.

SUMMARY

A method is disclosed of observing a change of mass inside a grinding unit as a part of a grinding process with a process input path feeding the grinding unit with input material to be ground, a storing unit for storing ground material from the grinding unit, and a process output path for removing ground material from the storing unit, the method comprising: determining a mass flow of the process input path ($m_1$) and a mass flow of the process output path ($m_5$); determining a change of mass of the grinded material inside the storing unit; and deriving a change of mass inside the grinding unit from the determined change of mass inside the storing unit and the determined mass flows, and based on a previously established mass balance for the grinding unit and a previously established mass balance for the storing unit.

A system is disclosed for observing a change of mass inside a grinding unit as a part of a grinding process, the system comprising: a storing unit for storing output of the grinding unit; a measuring device for determining the mass flow into the grinding unit; and a measuring device for determining the mass flow out of the storing unit; a measuring device for determining a change of mass inside the storing unit; and a processing unit for deriving a change of mass inside the grinding unit.

BRIEF DESCRIPTION OF THE DRAWINGS

The subject matter disclosed herein will be explained in more detail in the following detailed description with reference to preferred exemplary embodiments which are illustrated in the attached drawings, which schematically show in.

The reference symbols used in the drawings, and their meanings, are listed in summary form in the list of designations. In principle, identical parts are provided with the same reference symbols in the figures.

DETAILED DESCRIPTION

Figure 1:
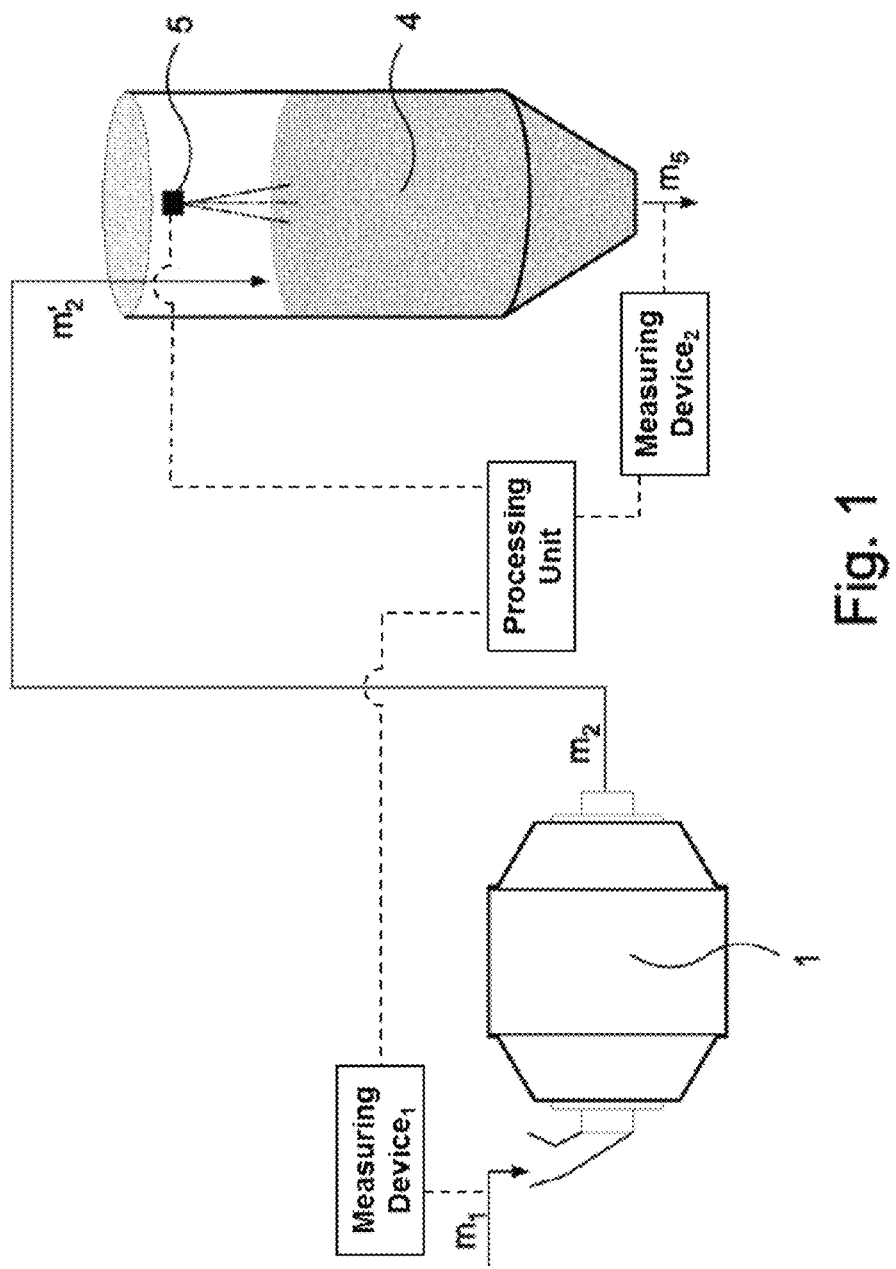
FIG. 1 an exemplary open circuit grinding process with a mill and a silo.

A reliable and accurate method is disclosed for observing a change of mass inside a grinding unit as part of a grinding process with a storing unit.

According to an exemplary embodiment, the change of mass inside the grinding unit can be observed in a sense of a state observer in contrast to a measurement of a quantity. A storing unit such as a silo can be connected with the grinding unit via a mill output path, and located in a flow direction of the material downstream of the grinding unit. The change of mass inside the grinding unit can be derived from a previously established mass balance for the grinding unit and a previously established mass balance for the storing unit. A mass flow of a process input path, a mass flow of a process output path, and a change of mass of the grinded material inside the storing unit as parts of the mass balances can be repeatedly determined. Determining can include measuring and deriving, wherein deriving can involve modeling.

In a first exemplary embodiment the grinding process is controlled using the estimated change of mass inside the grinding unit as an input for a controller. Thus an energy consumption of the grinding process can be reduced or optimized.

In a further exemplary embodiment the change of mass inside the grinding unit is derived using state estimation techniques such as a Kalman filter or a moving horizon estimation. Thus complex grinding processes with undetermined process models that, for example. due to the existence of unknown process variables, are not amenable to a direct analytical solution such as grinding process with determined process models can also be observed.

In a further exemplary embodiment, a grinding process disclosed herein can include a closed circuit with a sizing unit which can also be referred to as a separating unit or screening unit like a sieve, a screen, a separator cyclone, or a filter. The sizing unit is located in the flow direction of the material upstream of the storing unit separating coarse and fine material using a cutoff size. A return path returns coarse material from the sizing unit back to the grinding unit. The change of mass inside the grinding unit can be derived from the previously established mass balance of the grinding unit, the previously established mass balance of the storing unit, a previously established mass balance of the sizing unit, and a previously established mass balance of the return path. Thus, an exemplary method for observing the change of mass inside a grinding unit can be applied to systems with closed circuits grinding processes.

In a further exemplary embodiment, a change of mass inside the grinding unit return path is derived. This value is used to derive the change of mass inside the grinding unit. Thus more detailed aspects such as a transport delay in the return path can be modeled and lead to a higher accuracy of the observation.

In a further exemplary embodiment, the change of mass of the grinded material inside the storing unit is determined by optical or acoustic sensing of the surface of the mass inside the storing unit. Thus an accurate determination of the change of mass inside the storing unit can be provided.

FIG. 1 shows an exemplary open circuit grinding process with a mill 1 and a silo 4. Material that is to be ground enters the mill 1 through a process input path. In the mill 1, the material is ground. After the material has been ground, the material leaves the mill 1 through a mill output path connecting the mill 1 and the silo 4 and enters the silo 4 where the material is stored.

Material can be taken from the silo 4 via a process output path. There can be repeated measurements of a mass flow of the process input path $m_1$ and a mass flow of the process output path $m_5$ using weight sensors. In addition a fill volume $V_4$ inside the silo 4 can be measured using an optical surface sensor 5 with an exemplary mass balance for the mill 1 of, for example:

$$d/dt\ M_1 = m_1 - m_2$$

a mass balance of the silo 4, for a known average material density $\rho$ in the silo 4 of:

$$d/dt\ M_4 = m_2' - m_5 = d/dt\ V_4 \rho$$

and an assumption that there is no transport delay in the mill output path:

$$m_2 \approx m_2'$$

a following exemplary model equation for the change of mass inside the mill 1 can be:

$$d/dt\ M_1 = m_1 - m_5 - d/dt\ V_4 \rho$$

This model equation can be repeatedly solved using the repeatedly measured mass flow of the process input path $m_1$, repeatedly measured mass flow of the process output path $m_5$, and the repeatedly measured fill volume inside the silo.

Figure 2:
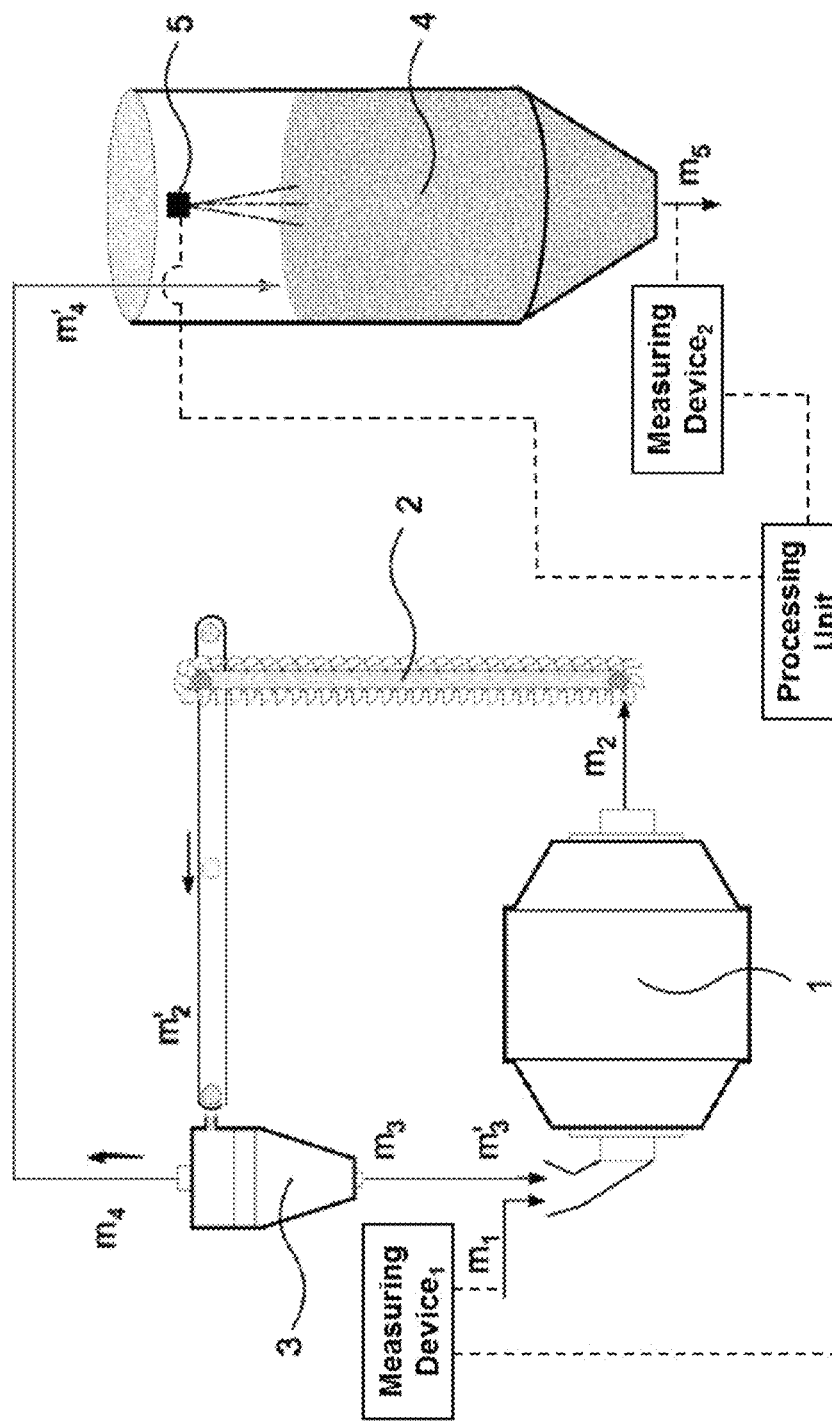
FIG. 2 an exemplary closed circuit grinding process with a mill, a separator cyclone, and a silo.

FIG. 2 shows an exemplary closed circuit grinding process. In addition to features of FIG. 1, a separator cyclone 3 is located between the mill 1 and the silo 4. The mill is connected with the separator cyclone through the mill output path. The grinded material leaving the mill 1, is for example lifted by an elevator 2, and enters the separator cyclone 3.

In the separator cyclone 3 the ground material is divided into coarse and fine material according to a cutoff size. The fine material flows through a separator output path into the silo 4. The coarse material is dropped back into the mill 1 through a mill return path with an exemplary mass balance for the mill 1:

$$d/dt\ M_1 = m_1 + m_3' - m_2$$

a mass balance of the separator cyclone, for an assumption that the change of mass inside the separator cyclone is negligible:

$$d/dt\ M_3 = m_2' - m^3 - m_4 \approx 0$$

a mass balance of the silo 4, for a known average material density $\rho$ in the silo 4:

$$d/dt\ M_4 = m_2' - m_5 = d/dt\ V_4 \rho$$

and assumptions that there are no transport delays in the mill output path, the mill return path and the separator output path:

$$m_2 \approx m_2'$$

$$m_3 \approx m_3'$$

$$m_4 \approx m_4'$$

a following exemplary model equation for the change of mass inside the mill 1 can be:

$$d/dt\ M_1 = m_1 - m_5 - d/dt\ V_4 \rho$$

Instead of the configurations shown in FIGS. 1 and 2, any open or closed circuit grinding configuration with one, two or more grinding stages can be used, such as for example a combination of a SAG mill and a ball mill which can include any form of grinding unit, separating unit, storing unit and in the case of an exemplary closed circuit arrangement, any form of return loop.

It is also possible to make other assumptions for the change of mass inside the return path and the separator cyclone 3 and/or to provide further measurements instead. If for example, contrary to the assumption discussed herein, a change of mass in the return path is accounted for, further measurements of additional process quantities may be desired. On the other hand, the model of the grinding process may become undetermined due to missing measurements, and a model and estimator approach such as a Kalman filter or a moving horizon estimation as described in EP 2169483 also published as related U.S. Pat. App. Pub. No. 20110208341) can be used to determine the change of mass inside the grinding unit. This can be particularly advantageous if, for example, the grinding process cannot be treated as time invariant. The measurement of the mass flow of the process input path $m_1$ and the mass flow of the process output path $m_5$ can be performed using other measuring principles such as optical measurement. For the measurement of the fill volume $V_4$ inside the silo 4 acoustic principles can be used.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS 1 mill
2 elevator
3 separator cyclone
4 silo
5 surface sensor
$m_1$ mass flow of the process input path
$m_2$ mass flow of the mill output path
$m_3$ mass flow of the mill return path
$m_4$ mass flow of the separator output path
$m_5$ mass flow of the process output path
$M_1$ mass inside the mill
$M_2$ mass in the return path
$M_3$ mass inside the separator cyclone
$M_4$ mass inside the silo
$V_4$ fill volume inside the silo

The invention claimed is:

1. A method for observing a change of mass inside a grinding unit as a part of a grinding process, the method comprising:
   determining a first mass flow ($m_1$) of input material feed along a process input path to the grinding unit, the feed input material to be grinded by the grinding unit;
   determining a second mass flow ($m_5$) of grinded material removed from a storage unit along a process output path, the storage unit storing grinded material from the grinding unit;
   determining a change of mass of the grinded material inside the storing unit;
   deriving a change of mass inside the grinding unit from the determined change of mass inside the storing unit and the determined first and second mass flows, and based on a previously established mass balance for the storing unit; and
   adjusting a grinding process operation based on the derived change of mass inside the grinding unit.

2. The method of claim 1, further comprising:
   controlling the grinding process in response to the observed change of mass inside the grinding unit.

3. The method of claim 2, wherein the step of deriving the change of mass inside the grinding unit is further based on a previously established mass balance for the grinding unit, and wherein the change of mass inside the grinding unit is derived using state estimation techniques of a Kalman filter or a moving horizon estimation.

4. The method of claim 3, wherein the step of deriving the change of mass inside the grinding unit is further based on a previously established mass balance for a sizing unit and a previously established mass balance for a return path, the sizing unit configured to separate coarse and fine material located upstream of the storing unit, the return path configured to return coarse material from the sizing unit to the grinding unit.

5. The method of claim 4, further comprising:
   deriving a change of mass value in the return path, and further wherein the step of deriving the change of mass inside the grinding unit is further based on the derived change of mass value in the return path.

6. The method of claim 1, wherein the step of deriving the change of mass inside the grinding unit is further based on a previously established mass balance for the grinding unit, and wherein the change of mass inside the grinding unit is derived using state estimation techniques of a Kalman filter or a moving horizon estimation.

7. The method of claim 1, wherein deriving the change of mass inside the grinding unit is further based on a previously established mass balance for the grinding unit, a previously established mass balance for a sizing unit, and a previously established mass balance for a return path, the sizing unit configured to separate coarse and fine material located upstream of the storing unit, the return path configured to return coarse material from the sizing unit to the grinding unit.

8. The method of claim 7, further comprising:
   deriving a change of mass value in the return path, and further wherein the step of deriving the change of mass inside the grinding unit is further based on the derived change of mass value in the return path.

9. A system for observing a change of mass inside a grinding unit as a part of a grinding process, the system comprising:
   a storing unit structured to store output of the grinding unit;
   a first measuring device structured to measure a first mass flow into the grinding unit;
   a second measuring device structured to measure a second mass flow out of the storage unit;
   a third measuring device structured to measure a change of mass inside the storing unit; and
   a processing unit structured to derive a change of mass inside the grinding unit based on the determined change of mass inside the storing unit.

10. The system of claim 9, wherein the third measuring device comprises:
    an optical or acoustic sensor for sensing of a surface of the mass inside the storing unit.

* * * * *